United States Patent
Drubel

(10) Patent No.: US 7,173,358 B2
(45) Date of Patent: Feb. 6, 2007

(54) ROTOR FOR AN ELECTRICAL MACHINE

(75) Inventor: Oliver Drubel, Nussbaumen (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 11/057,886

(22) Filed: Feb. 15, 2005

(65) Prior Publication Data
US 2005/0189835 A1 Sep. 1, 2005

Related U.S. Application Data

(63) Continuation of application No. PCT/CH03/00508, filed on Jul. 25, 2003.

(30) Foreign Application Priority Data

Aug. 16, 2002 (CH) .................... 1409/02

(51) Int. Cl.
H02K 3/48 (2006.01)
H02K 9/19 (2006.01)
H02K 9/20 (2006.01)

(52) U.S. Cl. .................. 310/201; 310/60 A; 310/61; 310/215

(58) Field of Classification Search ............ 310/58–59, 310/61, 60 A, 201, 214, 183, 215
See application file for complete search history.

(56) References Cited

U.S. PATENT DOCUMENTS 1,563,110 A * 11/1925 Regelein et al. ............ 310/214
2,755,395 A * 7/1956 Kilner ..................... 310/64
3,014,139 A 12/1961 Shildneck ................. 310/64
4,311,932 A * 1/1982 Olson ..................... 310/61
4,333,027 A 6/1982 Madsen ................... 310/61
4,363,986 A 12/1982 Joho et al. ............... 310/214
4,365,177 A * 12/1982 Madsen ................... 310/61
4,701,648 A 10/1987 Haditsch .................. 310/61
4,987,717 A 1/1991 Dameron, Jr. ............. 52/731
5,886,434 A * 3/1999 Nygard .................... 310/61
6,008,561 A * 12/1999 Tang ..................... 310/183
6,459,180 B1 * 10/2002 Mori et al. ............... 310/61
2003/0164248 A1 9/2003 Kulig et al.

FOREIGN PATENT DOCUMENTS

| CH | 638 349 | 9/1983 |
| CH | 649 422 | 5/1985 |
| DE | 283 698 | 4/1915 |
| DE | 196 21 058 | 11/1997 |
| DE | 100 08 807 | 9/2001 |
| WO | WO 00 10750 | 3/2000 |

OTHER PUBLICATIONS

International Search Report, International Application No. PCT/CH 03/00508, European Patent Office, Oct. 21, 2003.

* cited by examiner

Primary Examiner—Tran Nguyen
(74) Attorney, Agent, or Firm—Darby & Darby

(57) ABSTRACT

A rotor for an electrical machine, including axial conductors for the rotor field windings inserted into axial slots in the rotor body and are secured against the forces which occur during operation by peripherally arranged means, wherein a single conductor is disposed in each slot. The conductor is preferably disposed upright in the axial slot.

13 Claims, 2 Drawing Sheets

ROTOR FOR AN ELECTRICAL MACHINE

This patent application is a continuation of International Patent Application No. PCT/CH2003/00508, having an international filing date of Jul. 25, 2003, and which claims priority to Swiss Patent Application No. CH 2002 1409/02, filed on Aug. 16, 2002. The entire disclosure of both applications is incorporated by reference herein.

The present invention relates to a rotor for an electrical machine, in which axial conductors for the rotor field windings are inserted into axial slots in the rotor body and are secured against the forces which occur during operation by peripherally arranged means.

BACKGROUND

The rotating field of an electrical machine is normally produced by a rotor which has slots in which electrical conductors are located. The rotor core is normally in this case manufactured from steel, while the turns are produced from copper or from some other electrically conductive material. The inducing field is produced by passing direct current through these turns which direct current is either produced separately and is supplied to the conductors via brushes on the rotor shaft, or is produced directly on the shaft for so-called brushless excitation.

Owing to the high centrifugal forces which occur during operation of a rotor such as this, it is important for the conductors to be firmly wedged to the rotor core. On the other hand, it is important to efficiently dissipate the heat which is produced during operation, that is to say to ensure good cooling for the conductors.

This is normally achieved by providing slots in the rotor core, by then inserting two or more conductors one above the other and possibly also alongside one another into these slots, and by then using wedges to close the peripheral face of the slots and to secure the conductors by means of the wedges in the slots. In this case, the conductors are surrounded by an insulation layer. Alternatively, it is possible not to provide any wedges but in fact to provide rings which surround the rotor circumferentially and hold the conductors in the slots. In other words, the conductors are pressed radially towards them by the wedges or the rings, thus absorbing the centrifugal forces.

The cooling of arrangements such as these is normally made possible by providing cooling channels either in the conductors or between the conductors, and by circulating cooling gas or some other cooling medium through these cavities during operation.

Rotor geometries such as these are described, for example, in CH 638349 or CH 649422.

Arrangements such as these are subject to the problem that turns shorts occur frequently, caused by the insulation which is provided between the conductors being rubbed off and them then being mechanically so severely loaded by the powerful centrifugal forces during operation that the insulation effect is no longer ensured.

SUMMARY OF THE INVENTION

An object of the present invention is to provide a physically simple but robust rotor for an electrical machine, in which axial conductors for the rotor field windings are inserted into axial slots in the rotor body and are secured against the forces which occur during operation by peripherally arranged means.

The present invention provides a rotor for an electric machine in which conductors for the rotor field windings are inserted into slots in the rotor body and are secured against the forces which occur during operation by peripherally arranged means, characterized in that a single conductor is arranged in each slot.

According to the present invention, a large number of conductors are not arranged in layers one above the other in each slot as is typically done in the prior art. In the case of conductors such as these which are in layers one above the other, the intermediate insulation is subject to large centrifugal forces during operation, which can lead to turns shorts between the conductors if the insulation between the individual conductors is no longer reliably ensured as a result of large mechanical loads. These problems can be overcome in a physically simple manner by providing only one conductor in each axial slot.

A first embodiment of the invention is distinguished by the conductor having a width which is less than its height. In other words, a flat conductor is preferably inserted into the slot upright. In this case, the ratio of the width to the height of the conductor is preferably from 1:1.5 to 1:5, particularly preferably with a ratio of 1:2 to 1:4. The use of such upright conductors prevents, inter alia, the problems which occur with conductors located in the slots of bending of the conductors under the influence of centrifugal forces. This is because flat conductors located transversely in the slots (according to the prior art) have the tendency to bend when subject to powerful centrifugal forces and thus to reduce the space for gas transport or lead to unbalancing.

According to another embodiment of the invention, the means against the forces which occur during operation are in the form of slot wedges located at the top or rings which surround the rotor, with the rings preferably being shrunk on. The conductors can thus be inserted into the slot easily, and it is then possible either to insert the slot wedges in the axial direction or to place the rings around the rotor. Alternatively, it is also possible to provide the individual conductors directly with peripherally arranged axial projections (longitudinally running ribs or shoulders), which can be inserted into corresponding cutouts (longitudinal slots) in the axial slots in the rotor body. It is thus even possible to dispense with separate slot wedges.

The insulation between the conductors and the rotor body can be ensured by coating the conductors with an insulating layer, or by coating insulation on the inner face of the axial slot. In other words, a slot filling layer can be provided in the slot, and/or the conductor can be provided with an insulating coating with a thickness in the preferred region of 0.7 mm.

According to a further embodiment, cooling slits for circulation of the cooling medium in the axial and/or radial direction are advantageously provided between the conductor and the side walls of the axial slot, with the cooling slits preferably having a width in the range from 0.5 to 1.5 cm. These cooling slits are used not only to dissipate the heat that is produced during operation, but also for insulation between the conductor and the rotor body. The options which have been mentioned for insulation on the conductor or in the slot base, and/or on the slot walls, can also be used in conjunction with the cooling slits.

In order to further improve the cooling during operation, the conductors may have at least one axially running cooling channel, with the cooling channel preferably having a width which is less than its height. The total cross-sectional area of the axial cooling channels in a slot is in this case at least 80 percent of the conductive cross-sectional area of the conductor. The distance between the side wall of the axial slot and the side surface of the conductor should in each case be at least 3 mm.

The conductor is composed of aluminum or copper, or of an alloy which contains at least one of these metals. The slot wedges are preferably manufactured from bronze or non-magnetic steel. It is also possible to additionally arrange damper windings in the slots.

Further preferred embodiments of the present invention are described in the claims.

BRIEF DESCRIPTION OF THE DRAWINGS

The invention is explained in more detail in the following text using exemplary embodiments and in conjunction with the drawings, in which.

DETAILED DESCRIPTION

Figure 1:
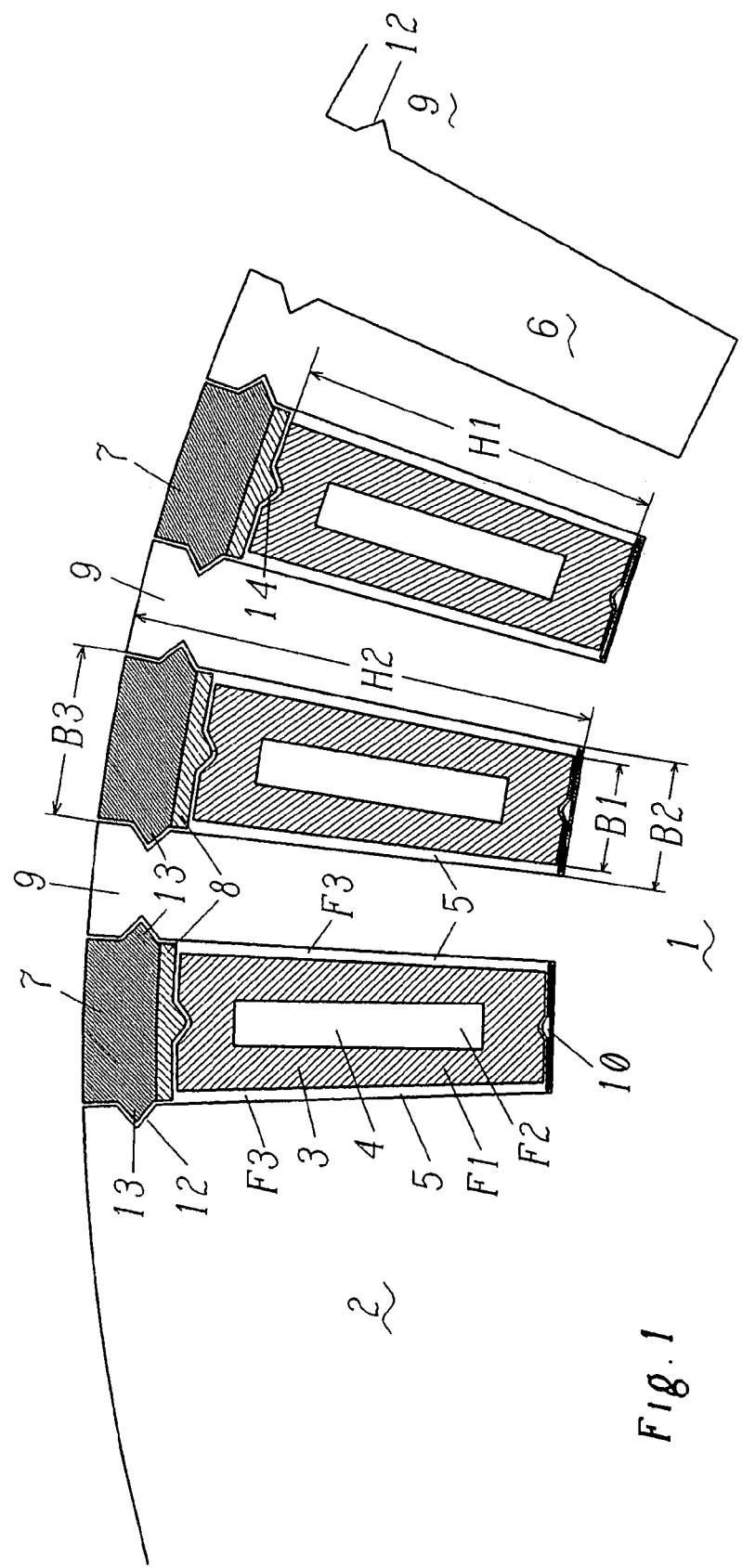
FIG. 1 shows an axial partial section through a rotor with conductors with cooling channels.

FIG. 1 shows a first exemplary embodiment of the present invention. The axial partial section covers the peripheral area of a rotor 1. The detail in this case shows a part of a pole area 2, as well as an area of the cutout in which the conductors 3 of the field windings are arranged. For this purpose, the rotor 1 has axial slots 6 in which the conductors 3 are inserted. In order to illustrate this better, one of the slots 6 is in this case shown without conductor. The axial slots 6 in this case have a depth H2 of about 15 cm at the slot base, that is to say the slots 6 have a width B2 in the region of 4 cm on the radially inner face, while they have a width B3 in the region of 5 cm at the peripheral end, because they have a slightly trapezoidal shape.

In the peripheral area, that is to say the outer area, the axial slots 6 have axial wedge slots 12. These are used for securing the slot wedges (see further below). The axial slots 6 are milled together with the wedge slots 12 from a forged rotor core. The rotor core is in this case normally manufactured from steel. A so-called slot filling layer, for example composed of polyamide with a thickness in the region of 0.7 mm, can be inserted into the slot 6 in order to ensure insulation for the rotor teeth 9 which are arranged between the slots 6. By way of example, it is possible to insert a film composed of Nomex (DuPont).

First of all, a spacer 10 is placed on the slot base in the axial slots 6. The spacer 10 is typically manufactured from an insulating material and, if required and as illustrated in FIG. 1, may have a projection which interacts with a notch in the conductor 3 to ensure robust positioning of the conductor 3 in the slot 6. A conductor 3 is then inserted into the slot 6. This conductor 3 in this case has a height H1 in the region of about 12 cm, and at its lower end has a width B1 in the region of 3 cm. The conductor 3 may also be slightly trapezoidal, that is to say it may have a greater width at its peripheral end. The conductor has a solid cross-sectional area F1 in the range from 5 to 50 cm$^2$. Gaps, so-called axial cooling slits 5, remain between the conductor 3 and the side walls of the axial slot 6. When their cross section is viewed, these cooling slits 5 have an area F3 in a slot. At its center, the conductor 3 has an axial cooling channel 4. This cooling channel 4 has a cross-sectional area F2. A cooling medium, for example a cooling liquid or a gas such as air or hydrogen, flows in the axial direction in the central cooling channel 4 and in the side cooling slits 5, and it is optionally possible to additionally provide channels which allow flow in the radial direction at specific points (for example radial holes in the slot wedges 7). In order to make it possible to ensure sufficient cooling for the conductors 3, the entire cross-sectional area F2+F3 that is available for the coolant should preferably be at least 80 percent of the solid cross-sectional area F1 of the conductor 3.

At the same time, the side cooling slits 5 also carry out another insulating function. The conductor 3 can be provided in a corresponding manner with an insulating coating. While such a coating is absolutely essential in a conventional design because the individual conductors touch, there is no need for a coating in this case since the insulation for the rotor teeth 9 is ensured by the air gap 5. The gap between the conductor 3 and the wall of the slot 6 should be at least 3 to 4 millimeters, in order on the one hand to allow good cooling and on the other hand to make it possible to ensure insulation.

The conductors 3 are manufactured from copper or aluminum, or from alloys which contain at least one of these metals.

Once the conductor 3 has been inserted into the slot 6, a spacer 8 is first of all placed on the conductors, in which case this spacer 8 is also manufactured from an insulating material and may have a bulge 14 which stabilizes the position of the conductor 3, in conjunction with a corresponding notch in the conductor 3. The slot wedge 7 is then pushed in from the axial direction in such a way that the wedge projections 13 engage in the side wedge slots 12. The slot wedges 7 may in this case extend over the entire length of the axial section of the conductors 3. However, it is also possible to use mutually adjacent slot wedge sections, or slot wedge sections which are spaced slightly apart from one another. The peripheral outer surface of the slot wedges 7 ends flush with the surface of the pole area 2.

The slot wedges 7 are manufactured from bronze or (nonmagnetic) steel. It is also possible for the spacer 8 and the slot wedge 7 to be formed integrally. Once the slot wedges 7 have been inserted, the conductors 3 can be stabilized by means of additional wedges, which are inserted from the axial end on the slot base, or by means of sprung prestressing.

Figure 2:
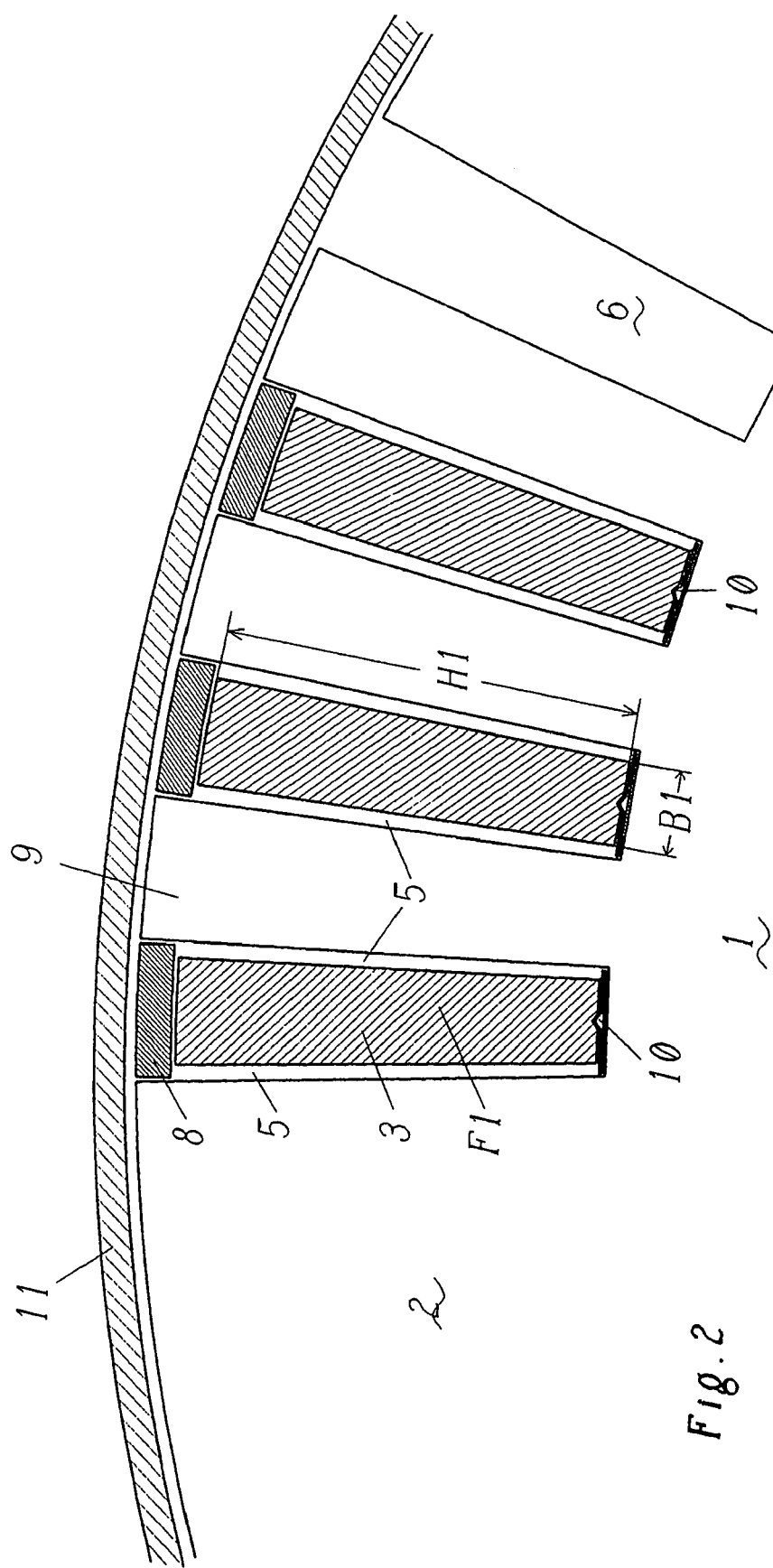
FIG. 2 shows an axial partial section through a rotor with conductors without cooling channels.

FIG. 2 shows a further exemplary embodiment in which the conductors 3 do not have a central cooling channel 4, with cooling being provided just by cooling slits 5 which are arranged at the sides of the conductors 3. Furthermore, the conductors 3 are not fixed in the slot 6 by means of slot wedges 7, but spacers 8 are first of all located on the conductors 3 (in this case, these may also or additionally be damper windings), with the spacers 8 ending flush with the surface of the pole area 2. Once the conductors 3 have been inserted, two or more rings 11 are fitted circumferentially around the rotor 1, along the rotor 1, in order to fix them in the slots 6. These rings 11 are tightened and thus fix the conductors 3 in the slots 6.

In both exemplary embodiments, the conductors 3 have a flat profile (the width B1 is considerably less than the height H1), and this flat profile is upright in the slots 6. The conductor thus has the maximum stability with respect to centrifugal forces. The conductors are connected in the conventional manner at the pole ends to form turns, or are connected to a direct-current supply in order to produce the excitation field. The direct current may in this case either be supplied via brushes, or may be produced directly on the shaft.

The proposed configuration of a rotor is also suitable, inter alia, for use in conjunction with superconducting rotors.

What is claimed is:

1. A rotor for an electrical machine, comprising:
   a plurality of conductors forming rotor field windings; and
   a rotor body including a plurality of slots for receiving the plurality of conductors, wherein not more than one conductor is disposed in each of the plurality of slots; and
   at least one peripherally arranged element configured to secure the plurality of conductors in the plurality of slots against forces occurring during operation of the rotor, wherein each of the plurality of conductors has a width and a height, the width being less than the height, wherein a ratio of the width to the height of each conductor is from 1:1.5 to 1:5.

2. The rotor as recited in claim 1, wherein the ratio is from 1:2 to 1:4.

3. The rotor as recited in claim 1, wherein the at least one element includes one of a slot wedge disposed at the top of each slot and an at least one ring surrounding the rotor.

4. The rotor as recited in claim 1, wherein the at least one element includes at least one shrunk-on ring.

5. The rotor as recited in claim 1, wherein the conductor includes at least one axially running cooling channel.

6. The rotor as recited in claim 5, wherein cooling channel has a width and a height, wherein the width is less than the height.

7. The rotor as recited in claim 5, wherein a total cross-sectional areas of the at least one axial cooling channel and the plurality of cooling slits one of the slots is at least 80 percent of a cross-sectional area of the conductor.

8. The rotor as recited in claim 1, further comprising at least one insulation element.

9. The rotor as recited in claim 8, wherein the at least one insulation element is a slot filling layer disposed in the slot.

10. The rotor as recited in claim 8, wherein the at least one insulation element is an insulating coating disposed on the conductor.

11. A rotor for an electrical machine, comprising:
    a plurality of conductors forming rotor field windings; and
    a rotor body including a plurality of slots for receiving the plurality of conductors, wherein not more than one conductor is disposed in each of the plurality of slots;
    at least one peripherally arranged element configured to secure the plurality of conductors in the plurality of slots against forces occurring during operation of the rotor; and
    at least one insulation element, wherein the at least one insulation element has a thickness of approximately 0.7 mm.

12. The rotor as recited in claim 1, wherein the conductor includes at least one of aluminum, copper, and an alloy containing at least one of aluminum and copper, and wherein the at least one peripherally arranged element includes at least one of a bronze and a nonmagnetic steel.

13. A rotor for an electrical machine, comprising:
    a plurality of conductors forming rotor field windings; and
    a rotor body including a plurality of slots for receiving the plurality of conductors, wherein not more than one conductor is disposed in each of the plurality of slots;
    at least one peripherally arranged element configured to secure the plurality of conductors in the plurality of slots against forces occurring during operation of the rotor; and
    a plurality of cooling slits disposed between the conductors and side walls of the axial slots, the cooling slits configured to enable a circulation of a cooling medium in at least one of an axial and a radial direction, wherein the cooling slits have a width from 0.5 to 1.5 cm.

* * * * *